May 26, 1970 S. GELDWERTH Re. 26,898

METHOD AND APPARATUS FOR ATTACHING A CLASP TO A BRACELET

Original Filed June 18, 1965

INVENTOR
SIMON GELDWERTH

BY Fisher, Christen, Sabol & Caldwell
ATTORNEYS

United States Patent Office

Re. 26,898
Reissued May 26, 1970

26,898

METHOD AND APPARATUS FOR ATTACHING A CLASP TO A BRACELET

Simon Geldwerth, 945 39th St., Brooklyn, N.Y. 11219

Original No. 3,350,764, dated Nov. 7, 1967, Ser. No. 465,091, June 18, 1965. Application for reissue July 3, 1969, Ser. No. 848,369
Int. Cl. A44b *19/00;* A44c *5/00;* B21f *43/00*
U.S. Cl. 29—160.6 25 Claims

Matter enclosed in heavy brackets [ ] appears in the original patent but forms no part of this reissue specification; matter printed in italics indicates the additions made by reissue.

ABSTRACT OF THE DISCLOSURE

A two piece clasp for a bangle bracelet *comprises two transverse abutting strips and a C-shaped spring strip which is precisely formed to be attached to one of the transverse strips for accurate locking engagement with the other transverse strip and* is pre-assembled with a coating of material inert to solder on the abutting surfaces of the clasp and then soldered to the abutting ends of the bracelet so that the two pieces of the clasp will not be joined together by the solder.

This invention relates to articles of jewelry, and more particularly to an improved method of permanently attaching a clasp to a so-called "bangle," or hollow, bracelet and more particularly, this invention relates to the type of clasp which comprises a pair of cooperating elements which are joined to the ends of a bracelet in abutting engagement when the bracelet is closed.

In order to properly assemble articles of this type, it is essential that the two elements of the clasp be arranged in precise alignment prior to soldering, or welding the metal clasp elements to the respective ends of the bracelet.

A prior method of attaching the clasp included the steps of soldering each of the two elements of the clasp to the ends of the bracelet separately, while the clasp was open. This required great care in order to insure that the elements of the clasp would be in alignment when the bracelet was closed.

In the practice of the present invention, it has been made possible to attach the clasp to the bracelet in a single soldering operation while the clasp is positioned on the bracelet in its closed position. This has been made possible by *precisely forming the C-shaped spring strip which, with one of two transverse abutting strips, comprises one of said two elements so that the spring strip will be accurately positioned on said one transverse strip for locking engagement with the other transverse strip comprising the other of said two elements,* coating one of the two abutting surfaces of the clasp with a substance which is inert to the soldering flux for the purpose of preventing them from becoming joined while at the same time permitting both elements of the clasp to be simultaneously soldered to the respective bracelet ends.

Other objects and advantages will be apparent to those skilled in the art after reading the following specification in connection with the annexed drawings, in which.

Figure 1:
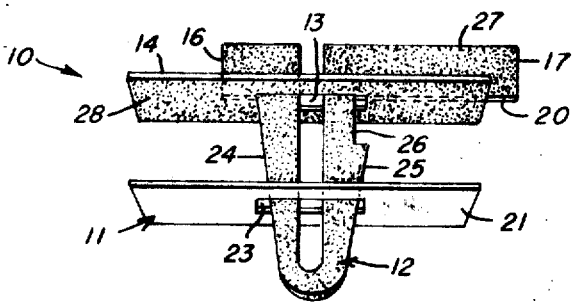
FIGURE 1 is a perspective view of a preferred form of clasp prepared in accordance with the present invention prior to its attachment to a bracelet.

Referring now to the drawings in detail, in FIGURE 1 there is shown a jewelry clasp of the type known in the trade as a single spring bangle snap, having a catch, indicated generally by numeral 10 to be secured to one end of a bracelet and a keeper, indicated generally by numeral 11 to be secured to the other end of a hollow bracelet. In this type of catch there is usually provided a generally C-shaped spring member indicated generally by numeral 12 which projects loosely through an elongated opening 13 provided in a medial portion of a flat strip of sheet metal 14 which, in turn, is to be permanently joined transversely across one of the open ends 15 of a hollow metal bracelet.

One of the free ends of the C-shaped spring is provided with a laterally projecting extension 16 which is permanently secured, as by soldering or welding, to the inner surface of the strip 14. The other of the free ends of the C-shaped spring is also provided with a lateral extension 17 of considerably greater length than the extension 16 and intended to project outwardly through an opening 18 provided in the periphery of the bracelet end 15, a sufficient distance so that the wearer of the bracelet may compress the spring to unlock the clasp by pressing against the free end of the extension 17 with the finger.

In order to prevent binding, it is desirable that there be a small amount of clearance between the rear wall 19 of the strip 14 and the forward edge 20 of the actuating arm 17.

The shapes and dimensions of the strips 14 and 21 are not critical so long as they are large enough to completely cover the ends of the bracelet, the excess metal being removed after the clasp has been joined to the bracelet. Strip 21 is provided with a medially disposed slot 23 positioned generally in alignment with the opening 13 and adapted to receive the forwardly projecting portion of the C-shaped spring 12. In this connection it should be noted that the outer margins 24 and 25 taper outwardly away from each other in a direction towards the free ends of the spring and that, adjacent the strip 14 the spring arm having the actuating member 17, is provided with an inwardly directed locking recess 26.

Figure 2:
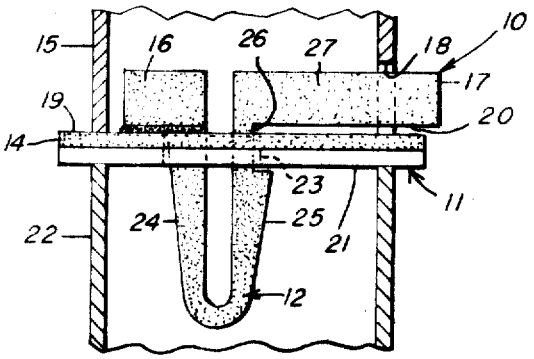
FIGURE 2 is a plan view of the clasp shown in FIGURE 1 assembled with the respective ends of a clasp (only fragmentary portions of which are shown) and prior to its permanent attachment thereto.
Figure 3:
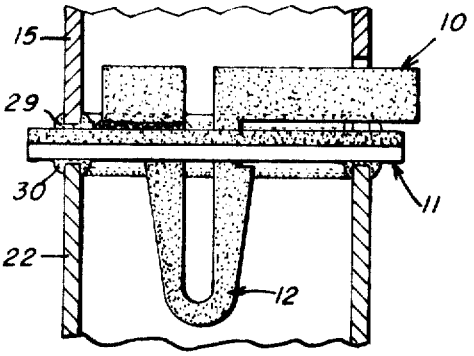
FIGURE 3 is a view similar to FIGURE 2 but showing the clasp after being secured to the bracelet.

The width of the slot 23 is such that while the forward end of the spring may be initially inserted therein without compression of the spring, further insertion of the spring will cause the free arm to be compressed towards the fixed arm until the strip 21 engages the locking recess 26 at which point the free arm will spring outwardly to position the ledge of the recess behind the strip 21, as seen in FIGURES 2 and 3. The length of the recess 26 should be such that the two strips 14 and 21 will be maintained substantially in abutting relationship when the clasp is locked, and the width of the opening 13 is preferably such that there will be a slight amount of clearance between it and the free arm when the spring is in the unstressed position. The clasp may be unlocked by exerting pressure against the end of the extension 17 to compress the free arm of the spring to allow the recess 26 to clear the slot 23.

Figure 5:
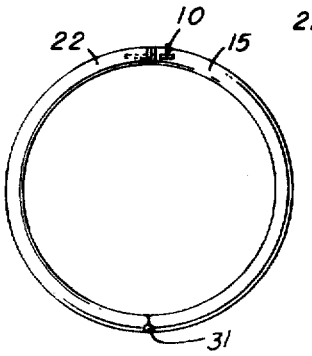
FIGURE 5 is a side elevation, on a reduced scale, showing a finished bracelet with the clasp in the closed position.

As will be seen in the drawings, the clasp is secured to a bracelet preferably by soldering the strips 14 and 21 transversely to the abutting ends 15 and 22 of the bracelet. To maintain the alignment of the two elements of the clasp, it is also preferable to assemble the clasp in its closed position, bringing the two ends of the bracelet together as in FIGURE 5 (in which a bangle bracelet is shown as having the separable portions joined by a hinge 31), and soldering the clasp to the bracelet while so assembled. However, if no precautions are taken the solder would not only flow into the joints between the strips 14 and 21 and the respective bracelet ends, but it would also flow between the strips 14 and 21 so that, upon cooling, the clasp would be inoperative.

To prevent soldering the two elements of the clasp together, it is necessary to coat one of the elements, preferably the catch 10, with a material inert to solder flux prior to assembling the catch. One such material is India ink, although any material capable of "dirtying" the surface of the metal will do. While only the exterior face of the strip 14 and the outwardly projecting portion of the spring 12 need to be thus protected, the entire catch 10 may be dipped in India ink and, when dried the entire surface of the spring and strip 14 will have received coatings 27 and 28 respectively which are inert to solder flux. This coating may be applied by the manufacturer and the clasp sold to the trade in this condition.

Figure 4:
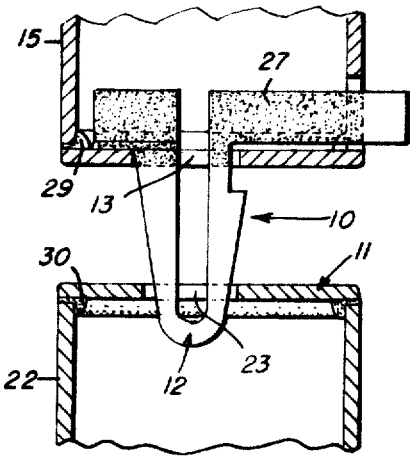
FIGURE 4 shows the clasp in a finished condition with excess metal removed and the ends of the bracelet separated.

If this procedure has been followed it is necessary to remove the coating from the rear surface 19 of the strip prior to assembly, as shown in FIGURE 2. The next step is to apply flux, heat and solder to the abutting surfaces of the bracelet and clasp, the solder adhering to the clean surfaces as indicated by numerals 29 and 30 in FIGURE 3. Finally, the excess metal of strips 14 and 21 projecting outwardly from the bracelet may be removed by filing, as shown in FIGURE 4, after which the bracelet may be opened and the inert coating material removed from the exposed surfaces of the catch.

The fact that the extension 16 of the C-shaped spring is permanently secured to the strip 14, preferably by uniting the two pieces by welding, makes it possible to cut the recess 26 to a size which will insure an accurate fit when the clasp is attached to the bracelet and eliminate any excess "lost motion" between the two ends of the bracelet when closed.

Previously, it was the practice to solder the spring catch to the transverse strip before cutting out the recess 26, this latter step being done by a time consuming process of trial and error.

According to the present invention, by using metal of carefully controlled thickness for the transverse strips 14 and 21, and by stamping out the spring 12 to precisely controlled dimensions, it is now possible to provide a preassembled two piece clasp which, when attached to a bracelet, will not require additional labor for adjustment of the catch.

Having disclosed one method and apparatus by which the invention may be practiced, it will be evident that various modifications and improvements may be made by those skilled in the art which would come within the scope of the annexed claims.

What is claimed is:

1. The method of securing a two part metal clasp to a metal bracelet having separable abutting end portions, said clasp being of the type wherein one of said two parts includes keeper means, the other of said two parts including spring means for releasable locking engagement with the keeper means, and each of said two parts are also provided respectively with complementary separable abutting surfaces, comprising the steps of interposing a layer of material inert to solder flux between said separable surfaces, assembling said clasp with said two parts in said locking engagement in association with the end portions of a bracelet with said surfaces in abutting relationship, and applying flux, heat and solder to join the two parts of the clasp with the respective end portions of the bracelet.

2. The invention as defined in claim 1, which includes the additional step of removing said inert material after the application of heat and solder.

3. The invention as defined in claim 1, wherein at least one of said two parts of the clasp has an over-all dimension greater than the cross-section of the bracelet, and includes the additional step of removing excess metal of the clasp after the application of heat and solder.

4. The invention as defined in claim 3, which includes the additional step of removing said inert material after the application of heat and solder.

5. The invention as defined in claim 3, wherein said two parts of the clasp are disposed transversely and in endwise abutting relationship with respect to the end portions of the bracelet.

6. Method of attaching a clasp to a bangle bracelet, said clasp being of the type wherein two flat strips of metal are soldered to the respective ends of the bracelet in separable face to face abutting relationship, one of said strips having latch means attached thereto for movement in a direction transverse to the surface of said flat strips for separable engagement with the other strip, comprising the steps of coating the abutting face of one of the strips with material inert to solder flux, assembling the two strips in abutting latching engagement, assembling the clasp and ends of the bracelet in closed position, and applying flux, solder and heat to unite said strips with said bracelet ends.

7. The method defined in claim 6, which includes the additional step of coating the latch with said inert material.

8. The method defined in claim 7, wherein the strip which has the latch is coated on both sides with said inert material.

9. The method defined in claim 8, which includes the additional step of removing the inert material on the side of the strip which abuts one end of the bracelet prior to assembling the clasp with the bracelet.

10. Method of attaching a clasp to a hollow bangle bracelet having two elongated parts hingedly joined to each other at their one ends for aligned abutting engagement with each other at their other ends, comprising the steps of providing two flat metal strips whose over-all dimensions are greater than the cross-section of the bracelet, attaching a latch to one of said strips, providing a medial opening in the other strip to operatively receive the latch therethrough with the strips in face-to-face abutting engagement, coating the abutting face of one of the strips with material inert to solder flux, assembling said strips and latch in said abutting relationship, assembling said clasp with the outside faces of the strips in abutting engagement with the respective other ends of a bracelet, applying flux, solder and heat to join said strips with the respective other ends of the bracelet while in abutting engagement, and removing the excess metal of said strips projecting outwardly of the surface of the bracelet.

11. The method defined in claim 10, which includes the step of removing the inert material from the clasp after the application of solder and heat.

12. The method defined in claim 10, wherein said inert material is India ink.

13. A clasp for a bangle bracelet comprising, a pair of flat strips of metal capable of being united by soldering with the responsive separable ends of a bracelet in aligned abutting superposed relationship, one of said strips being provided with latch means operatively projecting through an opening provided in the other strip, the side of one strip abutting the other strip being provided with a surface which is inert with respect to soldering flux.

14. The invention as defined in claim 13, wherein the surface of said latch means is also inert to said soldering flux.

15. The invention as defined in claim 14, wherein both sides of said one strip is provided with a surface inert to said soldering flux.

16. In a clasp for a bangle bracelet, a flat strip of metal having a media opening therethrough, a generally V-shaped latch having one leg attached to one side of the strip, with the base of the V projecting through the opening and the other leg free and disposed on the first side of the strip, said strip being capable of bonding to a bracelet by means of a solder material, the other side of the strip being covered with a removable coating of material inert to said solder material.

17. The invention as defined in claim 16, wherein said latch is also coated with said inert material.

18. The invention as defined in claim 17, wherein both sides of said strip are coated with the inert material.

*19. A latch for a hollow bangle bracelet clasp of the type wherein the opposing ends of the hollow bracelet are closed with a pair of transversely disposed flat strips of metal adapted to be placed in face-to-face abutment when the clasp is closed, the combination including a generally C-shaped latch member, one leg of said member having a laterally offset position to be attached to the rear surrface of one of said first mentioned strips to position the two legs of the latch for projection through aligned slotted openings in the abutting strips when the bracelet is closed, the other leg having a second laterally offset portion to project outwardly at one side of the bracelet for unlocking the latch, said other leg also having a locking recess for engagement with the rear surface of the other of said abutting strips when the bracelet is closed, the laterally offset portion of said one leg having a straight margin for abutting engagement with said rear surface of said one of the abutting strips to position the locking recess in correct relationship to the rear surface of the other of the abutting strips.*

*20. The invention defined in claim 19, wherein said locking recess includes a side wall angularly disposed with respect to the plane of said transversely disposed strips whereby said strips are wedgingly urged into said face-to-face abutting engagement when the clasp is closed.*

*21. The invention defined in claim 19, wherein said C-shaped latch member is comprised of a flat piece of sheet metal.*

*22. The invention defined in claim 19, wherein said C-shaped latch member is attached to said one of the transversely disposed flat strips by a bond of solder between the rear surface of said strip and the straight marginal portion of the laterally offset portion of said one leg.*

*23. The invention defined in claim 20, wherein said C-shaped member is fabricated from a flat strip of metal, the slotted openings in said transversely disposed strips are elongated and have a transverse width sufficient only to clear the passage therethrough of the C-shaped member, the C-shaped member being bonded to the rear surface of said one of the transverse strips by solder.*

*24. The invention defined in claim 19, wherein said second laterally offset portion extends generally in alignment with said first mentioned laterally offset portion to be disposed adjacent to but spaced from said rear surface of said one of the abutting strips against which said first mentioned offset portion abuts, said positioning of the second offset portion being assured by the disposition of said straight margin of the first mentioned offset portion.*

*25. The invention defined in claim 24, wherein said second laterally offset portion is provided with a straight margin to be disposed in spaced parallel relationship to said one of the abutting strips.*

References Cited

The following references, cited by the Examiner, are of record in the patented file of this patent or the original patent.

UNITED STATES PATENTS

| | | | |
|---|---|---|---|
| 1,308,741 | 7/1919 | Speidel | 29—485 |
| 1,385,117 | 7/1921 | Dinnhofer | 24—230 |
| 2,092,557 | 9/1937 | Quarnstrom | 29—490 |
| 2,952,058 | 9/1960 | Geldwerth | 24—230 |

FOREIGN PATENTS

| | | |
|---|---|---|
| 832,402 | 4/1960 | Great Britain. |

THOMAS H. EAGER, Primary Examiner

U.S. Cl. X.R.

24—230; 63—7